United States Patent [19]

Cline et al.

[11] Patent Number: 5,625,781

[45] Date of Patent: Apr. 29, 1997

[54] ITINERARY LIST FOR INTERFACES

[75] Inventors: Troy L. Cline, Cedar Park; Ricky L. Poston, Austin, both of Tex.; Jon H. Werner, Oceanside, Calif.

[73] Assignee: International Business Machines Corporation, Armonk, N.Y.

[21] Appl. No.: 551,016

[22] Filed: Oct. 31, 1995

[51] Int. Cl.[6] .................................................. G06F 15/00
[52] U.S. Cl. .............................. 395/335; 395/356; 395/357
[58] Field of Search .................................... 395/154, 155, 395/156, 157, 160, 161

[56] References Cited

U.S. PATENT DOCUMENTS

| | | | |
|---|---|---|---|
| 4,982,344 | 1/1991 | Jordan | 364/436 |
| 5,159,669 | 10/1992 | Trigg et al. | 395/159 |
| 5,276,789 | 1/1994 | Besaw et al. | 395/140 |
| 5,297,249 | 3/1994 | Bernstein et al. | 395/156 |
| 5,404,534 | 4/1995 | Foss et al. | 395/700 |
| 5,408,655 | 4/1995 | Oren et al. | 395/600 |
| 5,440,558 | 8/1995 | Ban | 370/85.1 |
| 5,446,891 | 8/1995 | Kaplan et al. | 395/600 |
| 5,499,369 | 3/1996 | Atkinson | 395/650 |

*Primary Examiner*—Raymond J. Bayerl
*Assistant Examiner*—Huynh Ba
*Attorney, Agent, or Firm*—Diana L. Roberts

[57] ABSTRACT

A uniquely programmed computer system, computer-implemented method, and computer readable memory embodying computer-readable detail logic direct a computer system to create a temporary list of links. The present invention creates the list of links without having to first open/visit the corresponding site to each link in the list or having to manually enter the name and address of the sites. The method includes placing the computer system in an itinerary mode, wherein the links lose their original function of opening/visiting the corresponding site when selected. The method includes displaying the list on a first portion of the display. The method includes selecting from a second portion of the display at least one link to be placed in the list. The method includes opening/visiting and displaying the site corresponding to the selected link on the second portion of the display in response to a selection of at least one link placed in the list.

11 Claims, 4 Drawing Sheets

ITINERARY LIST FOR INTERFACES

BACKGROUND OF THE INVENTION

1. Field of the Invention

The present invention relates to improvements in computer network interfaces, and more particularly, but without limitation, to a system, method, and memory for creating an itinerary list for any INTERNET or hypertext interface.

2. Background Information and Description of the Related Art

A user interacts with objects on a computer network using a "browser". A browser is a graphical user interface that allows users to navigate through the INTERNET. On the INTERNET, the user may navigate through various "sites", such as file systems, HTML documents, and file transfer protocol (FTP) sites. Conventional INTERNET browsers allow the user to explore these various sites using hypertext links. A hypertext link contains the name and URL (uniform resource locator) address of an INTERNET site. Typically, the browser displays hypertext links in a different shade of color from other text on the screen so that the user can readily identify the hypertext links. If a user clicks on a hypertext link, the browser takes the user from the current document to another document represented by that selected hypertext link. In turn, the destination document may contain additional hypertext links that go to yet more documents. In this manner, the user may navigate through multiple hierarchical layers of documents of various sites by continuing to select hypertext links.

However, there are certain disadvantages and limitations in conventional browsers. For example, suppose a page displays three hypertext links pointing to sites of particular interest to the user. The user begins by selecting a first hypertext link and may decide to navigate through several other hypertext links extending from the first link. When the user has finished navigating the path from the first hypertext link, he must return to the original page to select the second hypertext link. However, to do so, the user must backtrack through the links to the original page, whereupon the user can then select the second hypertext link. The obvious limitation of this procedure is that the user must select one link, look at it and follow its path, back up through a number of links to return to the original page, then select another link, navigate through it, back up, etc. This forward, backward, forward, backward jaunt through links is very tedious and time consuming. Also, in many cases the user cannot even navigate backward because the link's server is busy.

In an attempt to solve this problem, some conventional browsers utilize quicklists. A quicklist (also known as hotlist) is a stored list of links in some conventional browser, quicklists are permanent until the user manually deletes a link from the list. To store a link within the quicklist, the user must first open/visit the document represented by the link and then select an "add" button to add the link to the quicklist. Alternatively, the user may utilize the edit function of the quicklist to manually type in the name and address of the link.

Some other conventional browsers allow a user to save a link to their quicklist without first visiting it. However, the user may decide after visiting it that they do not wish to continue saving it. Deletion of a link in a quicklist can be tedious because the user must first find the link in what may be a very large list and then manually delete the link. Therefore, because it is tedious work to delete a link in a quicklist, users frequently visit the site before they add it to their quicklist. As such, the user must do all the backtracking if one page has multiple links of interest.

Therefore, there is a great demand for an interface browser that allows the user to store links into a temporary list that will not require manual deletion and will allow the user to visit multiple sites/documents on a page without backtracking. The user should be able to select any of the links in the itinerary at any time without backtracking, even if the user has navigated far away from the original page.

SUMMARY

Accordingly, a uniquely programmed computer system, computer-implemented method, and computer readable memory embodying computer-readable detail logic direct a computer system to create a temporary list of links. The present invention creates the list of links such that manual deletion of the links in the list is not required.

The method comprises the first step of placing the computer system in an itinerary mode, wherein the links lose their original function of opening/visiting the corresponding site when selected. A link has an original function of opening/visiting a corresponding site when selected. Accordingly, a link includes the name and address of the site. The second step includes displaying the list in a secondary window on a first portion of the display. The third step includes presenting at least one link in a second portion of the display so that the user can select a link to be placed in the list. The fourth step includes opening/visiting and displaying the site corresponding to the selected link in the second portion of the display in response to a selection of at least one link placed in the list.

Therefore, it is an object of the present invention to provide a browser that allows a user to select an itinerary of links without having to open/visit the site represented by the link or delete links that are no longer wanted.

It is a further object to provide a browser that allows the user to select and open/visit any of the links in the itinerary at any time without backtracking, even if the user has navigated far away from the original page.

These and other objects, advantages, and features will become even more apparent in light of the following drawings and detailed description.

DETAILED DESCRIPTION OF THE PREFERRED EMBODIMENT

The preferred embodiment includes a computer-implemented method, a uniquely programmed computer system, and a memory embodying detailed logic for directing a computer system to store links into a temporary list that will not require manual deletion and will allow the user to visit multiple sites/documents on a page without backtracking.

Figure 1:
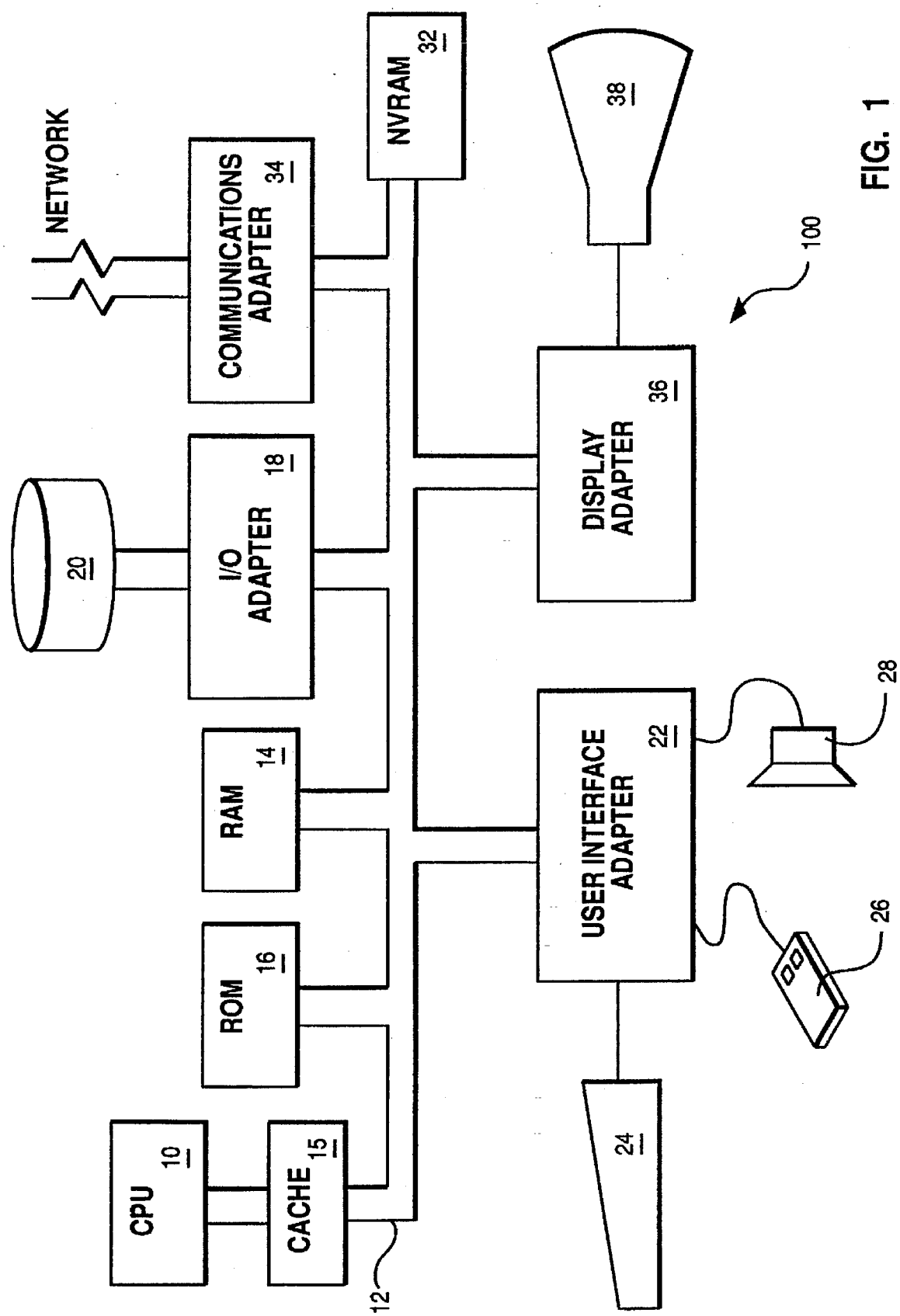
FIG. 1 illustrates a schematic diagram of a computer system for use with the present invention.

The present invention is practiced in a laptop computer or, alternatively, in the computer system illustrated in FIG. 1.

Computer system 100 includes central processing unit (CPU) 10, such as an IBM's™ PowerPC™ 601 or Intel's™ 486 microprocessor for processing cache 15, random access memory (RAM) 14, read only memory 16, and non-volatile RAM (NVRAM) 32. One or more disks 20, controlled by I/O adapter 18, provide long term storage. A variety of other storage media may be employed, including tapes, CD-ROM, and WORM drives. Removable storage media may also be provided to store data or computer process instructions.

Instructions and data from the desktop of any suitable operating system, such as Sun Solaris™, Microsoft's Windows NT™, IBM's OS/2™, Apple's System 7™, control CPU 10 from RAM 14. Accordingly, the desktop executes from RAM 14. However, in the preferred embodiment, an IBM RISC System/6000™ runs the AIX™ operating system. As previously described, however, one skilled in the art readily recognizes that other hardware platforms and operating systems may be utilized to implement the present invention.

Users communicate with computer system 100 through I/O devices (i.e., user controls) controlled by user interface adapter 22. Display 38 displays information to the user, while keyboard 24, pointing device 26, and speaker 28 allow the user to direct the computer system. Communications adapter 34 controls communications between this computer system and other processing units connected to a network by network interface 40. Display adapter 36 controls communications between this computer system and display 38.

Figure 2:
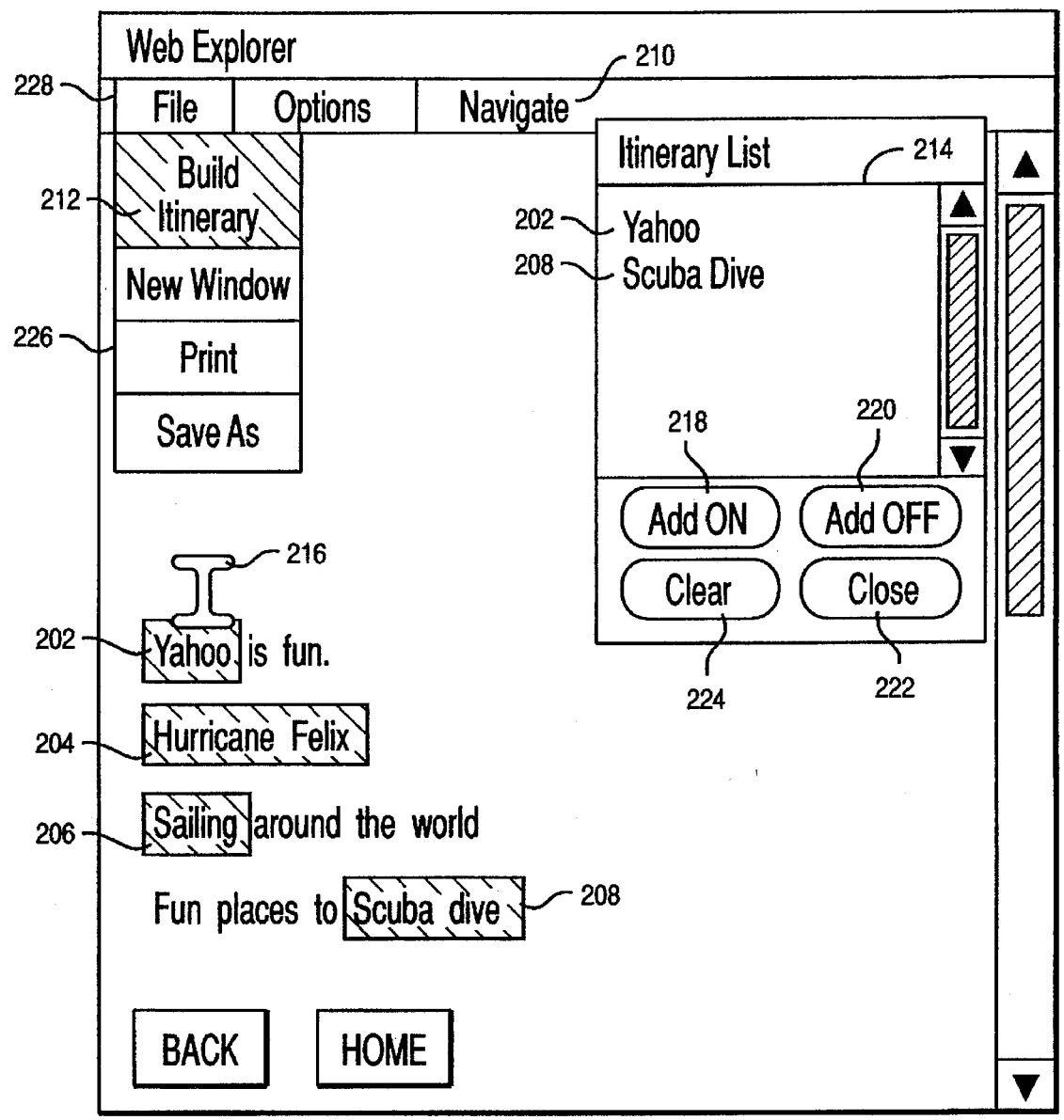
FIG. 2 illustrates a frontal display diagram of the browser in accordance with the present invention.

Referring to FIG. 2, the preferred embodiment includes an INTERNET browser for displaying window 200 on display 38. For ease and explanation, the following description describes the browser as performing unique functions and features. In actuality, the browser merely directs CPU 10 to perform those functions and features.

Window 200 is a two-dimensional workspace for displaying text, hypertext links 202, 204, 206 and 208, menu bar 210, itinerary list 214, and drop-down list 226. The diagonal hatching marks on hypertext links 202, 204, 206 and 208 indicate to the user that they are indeed hypertext links. Alternatively, hypertext links 202, 204, 206 and 208 could be represented in a different color from the other text.

Menu bar 210 allows the user to select various operations. In the preferred embodiment, the user may "turn on" the itinerary function by selecting file button 228 using a pointing device. Selecting buttons using a pointing device (e.g., mouse and mouse pointer) is well known in the computer art and need not be further described. When the user clicks on file button 228, drop-down menu 226 appears. The user then scrolls down drop-down menu 226 to select "build itinerary" button 212. When selected, build itinerary button 212 places the browser in an "itinerary" mode. The user knows that the browser is in the itinerary mode because mouse pointer 216 changes shape to an "I". Alternatively, any shaped pointer could be utilized when in the itinerary mode. When in the itinerary mode, if the user selects a hypertext link, the browser will not load the document represented by the URL, but rather will add that link and its URL to itinerary list 214. Conversely, if the browser is in the non-itinerary mode, a selection of a hypertext link would cause the browser to load the document represented by the URL.

Itinerary list 214 is a small window that remains on the screen while active and may be placed anywhere on the screen. However, once the session ends or the user closes itinerary list 214, the browser clears the contents of itinerary list 214. Therefore, itinerary list 214 is not permanent storage, but is merely a temporary itinerary of links that the user intends to visit in the future. The user may move the browser from "itinerary" mode to "non-itinerary" mode by selecting "add off" button 220. Conversely, "add on" button 218 moves the browser from the non-itinerary mode to the itinerary mode. To remove all the links from itinerary list 214, the user merely selects "clear" button 224. "Close" button 222 moves the browser into the non-itinerary mode, clears the list, and removes itinerary list 214 from the screen. Additional buttons, such as a help button and/or a cancel button, could be added.

Referring again to FIG. 2, because the user selected yahoo hypertext link 202 and scuba dive hypertext link 208 when the browser was in the itinerary mode, the browser added them to itinerary list 214. The user then single clicked over yahoo hypertext link 202 in itinerary list 214 to open/visit its corresponding site, which is illustrated in FIG. 3.

Figure 3:
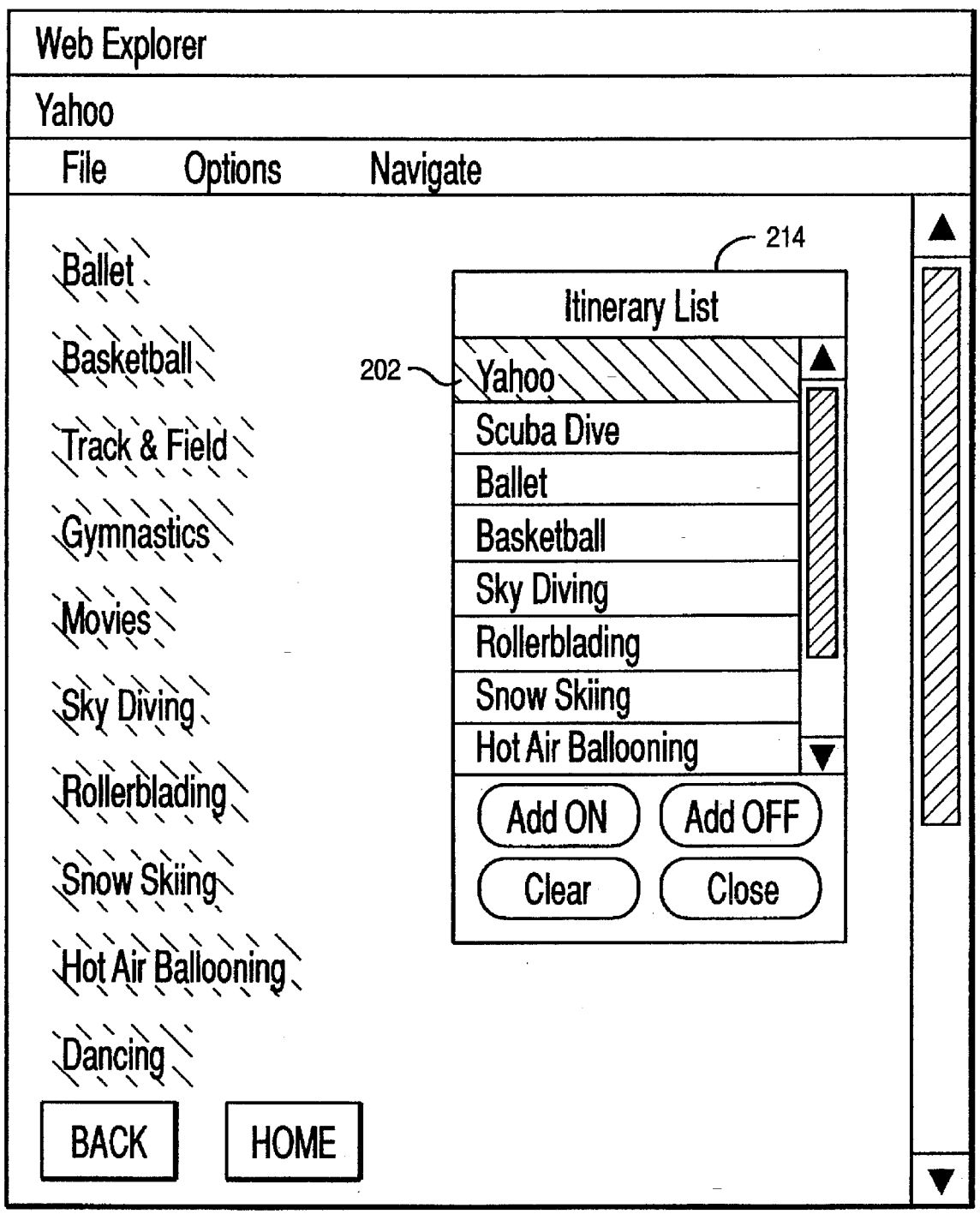
FIG. 3 illustrates a frontal display diagram of the browser in accordance with the present invention.

FIG. 3 illustrates "yahoo" window 300, which, in turn, displays a page of links. In this example, the user selected a number of hypertext links from "yahoo" window 300 to be placed in itinerary list 214. The links in itinerary list 214 (e.g., yahoo hypertext link 202) change color once they have been selected and opened/visited.

Figure 4:
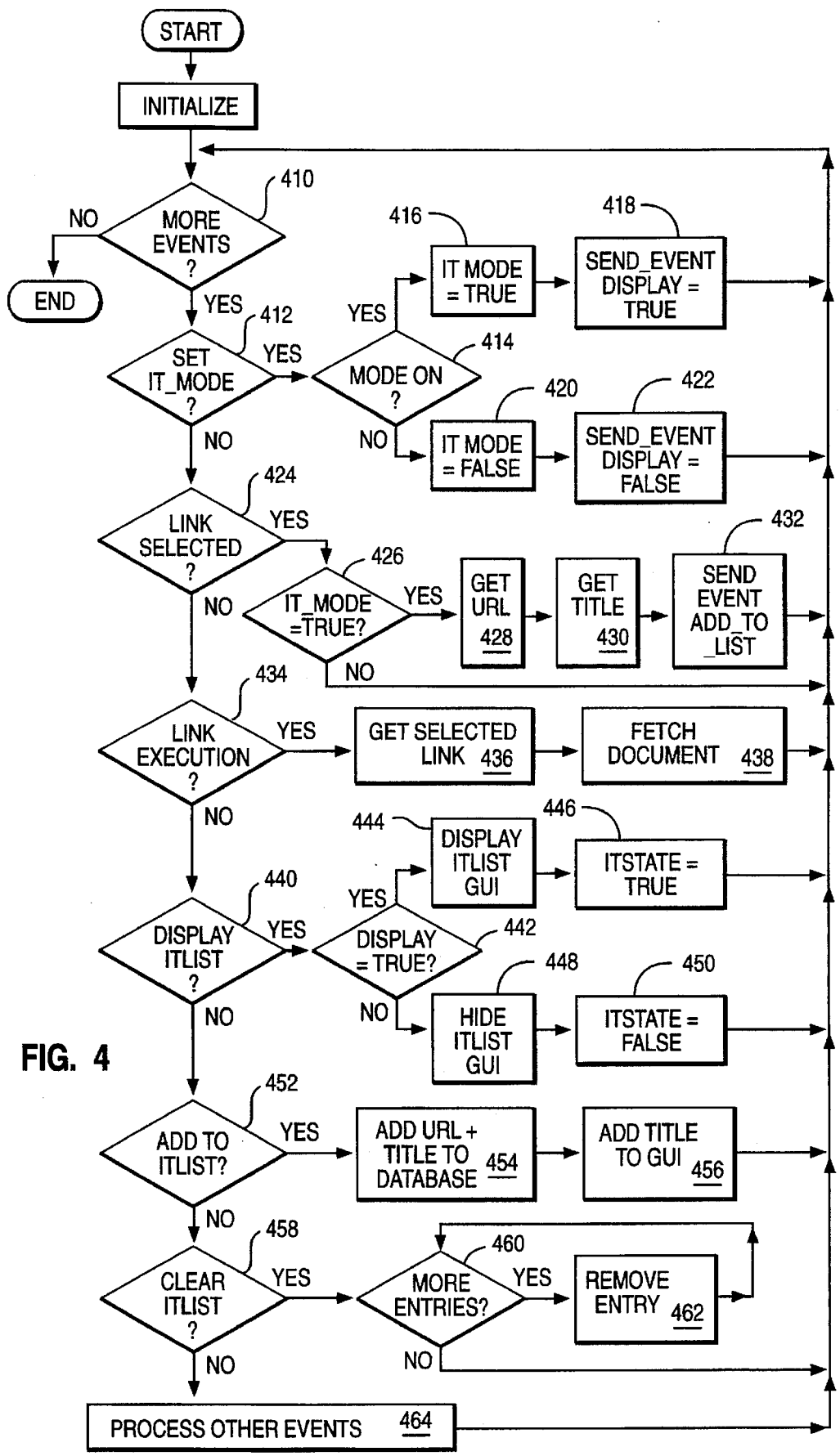
FIG. 4 illustrates a flowchart of detailed logic according to the present invention.

FIG. 4 illustrates a flowchart of detailed logic for implementing the preferred embodiment. At 410, the browser makes a determination if more events need to be processed. If so, at 412, the browser makes a determination if the itinerary mode has changed state, either from itinerary mode to non-itinerary mode or vice versa. This could occur if the user has clicked on build itinerary button 212, "add on" button 218, "add off" button 220 or "close" button 222 (please see FIG. 2). At 414, the browser makes a determination if the itinerary mode has been "turned on." This would occur if the browser detects that the user clicked on build itinerary button 212 or "add on" button 218. If turned on, at 416, the browser sets a variable "IT mode"=TRUE and, at 418, generates a "TURN ON DISPLAY LIST" signal event (i.e., Display=TRUE).

Returning to 414, if the itinerary mode was turned off (e.g., the user clicked on "add off" button 220 or "close" button 222), at 420, the browser sets the variable "IT mode"=FALSE and, at 422, the browser generates a "TURN OFF DISPLAY LIST" event (i.e., Display =FALSE). Control returns to 410 where a determination is made if more events exist.

Returning to 412, if the browser makes a determination that the itinerary mode has not changed state, at 424, the browser determines if the event is a "link selected event". Such an event would occur if the browser detects that the user clicked on one of hypertext links 202, 204, 206 or 208. If so, at 426, the browser determines if the itinerary mode is "ON" or "OFF" by checking the state of "IT mode" variable to see if it has been set TRUE or FALSE. If set TRUE, at 428, the browser retrieves the URL address of the selected hypertext link and, at 430, retrieves the name of the document (i.e., the text representing the link). At 432, the browser generates an "ADD TO LIST" event. This event indicates that the selected document needs to be added to itinerary list 214. Control returns to 410, where the browser processes more events.

If 412 and 424 were both "NO", at 434, the browser determines if a "LINK EXECUTION" event has been generated. Such an event would have generated if the user had clicked on a hypertext link displayed in itinerary list 214, such as hypertext links 202 or 208. If so, at 436, the browser retrieves the URL of the selected hypertext link and, at 438, fetches the document represented by the hypertext link. Control returns to 410.

At 440, the browser determines if a "TURN ON" or "TURN OFF DISPLAY LIST" event has occurred. This event would have been generated at either step 418 or 422. If Display=TRUE at 442, at 444, the browser displays itinerary list 214. At 446, the browser sets a variable "ITSTATE"=TRUE. At 448, if Display=FALSE, the browser hides itinerary list 214 and, at 450, sets the variable "ITSTATE"=FALSE. Control returns to 410.

If 410, 412, 424, 434 and 440 are all "NO", at 452, the browser determines if the "ADD TO LIST" event was generated at 432. In other words, the browser determines if the user attempted to add a document to itinerary list 214. If so, at 454, the browser adds the URL and name of the document to a database of documents (not shown) and, at 456, adds the name to the GUI (i.e., displays the name to the user in itinerary list 214). Control returns to 410.

If 410, 412, 424, 434, 440, and 452 are all "NO", at 458, the browser determines if a "CLEAR ITLIST" event occurred. This event would have occurred if the user had clicked on "clear" button 224 (or a keyboard equivalent). If so, at 460 and 462, the browser erases all entries in itinerary list 214 and in the database (not shown). Control returns to 410.

At 464, other events are processed, if any exist, and control returns to 410 where, if no more events are to be processed, the flow ends.

The flow of execution of the preferred embodiment is as follows:

---

Itinerary List Code

---

TERMS:
    ItList           - Itinerary list
    ItList dialog     - dialog box (window) containing itinerary list
    ItList database   - database containing the itinerary list information
- - - INITIALIZATION - - -
    // Set Itinerary Mode to false
    //
    ItMode = FALSE
    // Current state of ItList dialog - hidden or shown (FALSE = hidden)
    //
    ItState = FALSE
- - - EVENT PROCESSING - - -
    WHILE (more events to process)
        //
        // This event is caused by the user selecting the Start Itinerary
        // mode. This can be done by the user selecting a menu item or
        // performing a keyboard combination for instance.
        //
(412)    IF (SET_ITINERARY_MODE Event)
(414)        IF (set mode On)
(410)            ItMode = TRUE            //Itinerary mode is ON
(418)            Send_Event (DISPLAY_ITLIST)    //Show the ItList dialog
        ELSE
(420)            ItMode = FALSE           //Itinerary mode is OFF
(422)            Send_Event (DISPLAY_ITLIST)    //Hide the ItList dialog
        ENDIF
    ENDIF
    //
    // This event is caused by the end user selecting a hypertext link
    // on a web page from within a web browser. This could be from
    // the user single clicking with the mouse or if the browser
    // supports keyboard traversal, then it would be caused by the
    // user selecting the SELECTION Key.
    //
(424)    IF (LINK_SELECTION Event)
(426)        IF (ItMode is TRUE)
(428)            Get url address of link
(430)            Get title of link
(432)            Send (ADD_TO_ITLIST Event)
        ELSE
        ENDIF
    ENDIF
    //
    // Caused when the user selects a link from the ItList dialog.
    //
(434)    IF (LINK_EXECUTION Event)
(436)        Get ItLink Selected
(438)        Execute ItLink               //Fetch the document
    ENDIF
    //
    // Event to display or hide the ItList dialog box.
    //
(440)    IF (DISPLAY_ITLIST Event)
(442)        IF (show itlist)
(444)            Display ItList dialog box
(446)            ItState = TRUE
        ELSE
(448)            Hide ItList dialog box -continued

| Itinerary List Code |
| --- |
| (450)        ItState = FALSE <br>        ENDIF <br>        // <br>        // Event to add a link to the ItList database and dialog <br>        // <br>(451)        IF (ADD_TO_ITLIST Event) <br>(454)           Add url and title to datebase <br>(456)           Add title to gui itlist <br>        ENDIF <br>        // <br>        // Event to remove all entries in the ItList database <br>        // <br>(458)        IF (CLEAR_ITLIST Event) <br>           WHILE (More Entries in database) <br>(460)             Get database entry <br>(462)             Remove database entry <br>           ENDWHILE <br>        ENDIF <br>        // <br>(464)        // Process other events <br>        // <br>        IF (Other Events) <br>           process other events <br>        ENDIF <br>     ENDWHILE |

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A computer-implemented method for directing a computer system to create an itinerary list, the computer system having at least a display for displaying links thereon, each link of a particular site having an original function of opening and displaying a corresponding new site when selected, comprising the steps of:

(a) placing the computer system in an itinerary mode, wherein the links displayed on the display do not have the original function of opening the new corresponding site when selected;

(b) in response to placing the computer system in the itinerary mode, displaying an itinerary list on a first portion of the display; and (c) in response to a selection from a second portion of the display of at least one link, copying the selected link in the itinerary list, whereby the link copied in the itinerary list regains the original function, while the links in the second portion do not have the original function as long as the computer system is in the itinerary mode.

2. The computer-implemented method according to claim 1 further comprising the step of:

selecting from the second portion of the display a second link to be placed in the itinerary list; and in response to a selection of the second link placed in the itinerary list, opening and displaying a document corresponding to the selected second link.

3. The computer-implemented method according to claim 1 further comprising the step of:

placing the computer system in a non-itinerary mode, wherein the links in the second portion regain the function of opening the corresponding document when selected.

4. The computer-implemented method according to claim 1 further comprising the step of:

in response to a second selection of at least one link placed in the itinerary list, opening and displaying the new site corresponding to the selected link on the second portion of the display.

5. The computer-implemented method according to claim 4 further comprising:

in response to opening the new site corresponding to the selected link on the display, selecting from the new site display at least another link to be placed in the itinerary list.

6. An article of manufacture comprising:

a computer usable medium having computer readable program code means embodied therein for directing a computer system to create an itinerary list, the computer system having at least a display for displaying links thereof, each link of a particular site having an original function of opening and displaying a corresponding new site when selected, the computer readable program code means in said article of manufacture comprising:

(a) computer readable program code means for placing the computer system in an itinerary mode, wherein the links displayed on the display do not have the original function of opening the corresponding new site when selected;

(b) in response to placing the computer system in the itinerary mode, computer readable program means for displaying an itinerary list on a first portion of the display; and (c) in response to a selection from a second portion of the display of at least one link, computer readable program means for copying the selected link in the itinerary list, whereby the link copied in the itinerary list regains the original function, while the links in the second portion do not have the original function as long as the computer system is in the itinerary mode.

7. The article of manufacture according to claim 6 further comprising:

computer readable program means for selecting from the second portion of the display a second link to be placed in the itinerary list; and in response to a selection of the second link placed in the itinerary list, computer readable program means for opening and displaying the new site corresponding to the selected second link.

8. The article of manufacture according to claim 6 further comprising:

computer readable program code for placing the computer system in a non-itinerary mode, wherein the links in the second portion regain the function of opening the corresponding site when selected.

9. The article of manufacture according to claim 6 further comprising:

in response to a second selection of at least one link placed in the list, computer readable program means for opening and displaying the site corresponding to the selected link on the second portion of the display.

10. The article of manufacture according to claim 9 further comprising:

in response to opening the new site corresponding to the selected link on the display, computer readable program means for selecting from the display at least another link to be placed in the itinerary list.

11. A computer system for creating an itinerary list, the computer system having at least a display for displaying links thereon, each link of a particular site having an original function of opening and displaying a corresponding new site when selected, comprising the steps of:

(a) means for placing the computer system in an itinerary mode, wherein the links displayed on the display do not have the original function of opening the new corresponding site when selected;

(b) in response to placing the computer system in the itinerary mode, means for displaying an itinerary list on a first portion of the display; and (c) in response to a selection from a second portion of the display of at least one link, means for copying the selected link in the itinerary list, whereby the link copied in the itinerary list regains the original function, while the links in the second portion do not have the original function as long as the computer system is in the itinerary mode.

* * * * *